United States Patent

[11] 3,602,581

| [72] | Inventor | Helmut A. Heine<br>Herrsching, Obb, Germany |
|---|---|---|
| [21] | Appl. No. | 817,949 |
| [22] | Filed | Apr. 21, 1969 |
| [45] | Patented | Aug. 31, 1971 |
| [73] | Assignees | Optotechnik G.m.b.H.;<br>Propper Manufacturing Company, Inc. |
| [32] | Priority | May 15, 1968 |
| [33] | | Germany |
| [31] | | P 17 72 434.4 |

[54] SKIASCOPE
17 Claims, 12 Drawing Figs.

[52] U.S. Cl. .................................................. 351/15,
351/9, 351/13, 351/16
[51] Int. Cl. ........................................................ A61b 3/10
[50] Field of Search ............................................. 351/1, 6,
13, 15, 16, 9

[56] References Cited
UNITED STATES PATENTS

| 887,032 | 5/1908 | De Zeng | 351/16 X |
| 1,281,136 | 10/1918 | Clement | 351/6 |
| 1,626,601 | 5/1927 | Clement | 351/15 X |
| 1,692,241 | 11/1928 | Armbruster | 351 16 X/ |
| 1,783,461 | 12/1930 | Cameron | 351/6 |
| 2,453,888 | 11/1948 | Allyn | 351/6 |
| 2,715,352 | 8/1955 | Jobe | 351/16 X |
| 2,726,570 | 12/1955 | Thorburn | 351/16 X |
| 3,315,680 | 4/1967 | Silbertrust et al | 351/6 (UX) |
| 3,439,978 | 4/1969 | Moore et al. | 351/16 X |

FOREIGN PATENTS

| 436,537 | 10/1935 | Great Britain | 351/6 |

Primary Examiner—David Schonberg
Assistant Examiner—Paul A. Sacher
Attorney—Blum, Moscovitz, Friedman and Kaplan ABSTRACT: A skiascope to be used in examining the eye to determine the refractive behavior thereof when light is directed to the eye. An illuminating structure is provided for directing light to a reflector of the skiascope. This reflector directs the light to the eye which is to be examined, and it is possible to observe the eye directly through the body of the reflector which is semitransparent. The observation is made by observing a part of the rear surface of the reflector while the light is reflected from the front surface to the eye. Thus, light travels from the eye through the reflector to provide an observation of the eye at the rear surface of the reflector. The thickness of the reflector and its inclination is such that light received in the interior of the reflector from the source of illumination will engage only a portion of the rear surface which is displaced from the part thereof through which the eye is observed, so that at this part of the rear surface which provides an observation of the examined eye there is only light which travels from the eye and not any light from the source of illumination.

INVENTOR.
HELMUT A. HEINE
BY
ATTORNEYS

INVENTOR.
HELMUT A. HEINE 3,602,581

SKIASCOPE

BACKGROUND OF THE INVENTION

The present invention relates to skiascopes.

As is well known, skiascopy is used to determine refraction characteristics in an objective manner. Thus, such instruments are used for the objective determination of refraction anomolies of the human eye. In particular, with such instruments, without any particular cooperation on the part of the patient, it is possible to determine objectively the refraction characteristics of the eye, so that considerable advantages are achieved as contrasted with subjective methods of determination of these factors. In particular, it is possible for an objective determination of the refraction characteristics to be very quickly carried out, and when properly carried out a greater accuracy is achieved than with a subjective method.

Of course, it is essential, in order to achieve the advantages of skiascopic methods, to have on hand a suitable skiascope.

A skiascope which will give the desired results in the best possible way must fulfill several requirements.

Thus, one of the requirements is in connection with the manner in which light is directed to and from the eye which is examined. The deflection of the light from a suitable light source toward the eye is carried out by a suitable reflector which must be provided, for example, with an observation opening through which the examining physician will have a view of the eye of the patient. Also, the reflector can be made of a semitransparent material so that it is also possible to look directly through the reflector. This latter type of solution will in general be preferred, as will be apparent from the further explanations below.

The light which comes from the light source creates a certain disadvantage with conventional constructions in that part of this light will be received by the eye of the observer so as to disturb the viewing of the eye of the patient. Thus, part of the light from the light source will either travel through the observation opening to the eye of the examining physician or will travel through the semitransparent reflecting body to the eye of the physician, and thus it is not possible to provide a view of the examined eye without disturbances resulting from light from the light source.

Attempts have already been made to solve this latter problem, but up to the present time only the most expensive constructions have been provided to avoid this problem. For example, it is known to provide a plate of dark glass which is provided with an optically polished and nonreflective exterior surface which will partially absorb light and which will partially direct the light to an interior location of the skiascope where a black lacquer is provided. For example, the German Gebrauchmuster Pat. No. 1,913,910 shows such a construction.

With another type of construction which is also relatively expensive, a light guiding tube is provided around the reflector and an optically polished reflection body of conical configuration is situated therein. This latter body has an extremely sharp point, and light is absorbed by repeated reflections between the cone and the surrounding surface. Thus, this solution is extremely inconvenient and very expensive.

A further requirement of a skiascope is that it provide a convenient, easy visibility of the skiascopic phenomena even when the operations are carried out in a room which has not been darkened.

Fulfillment of this latter requirement saves the physician a considerable amount of time because it avoids the necessity of movement between a special examining area which is suitably darkened and a regular office area which is at ordinary illumination. Of far greater importance, is the fact that by maintaining the room at ordinary daylight illumination, the pupil of the patient will not become undesirable enlarged, while adapting to darkness, and in this way spherical aberrations are maintained at a low level, which is of extreme importance in examinations of this type.

Thus, by making it possible to avoid darkening of the room the behavior of the patient's eye with respect to the light will have a far more precise significance.

In order to have a skiascope which will operate properly in a room which has not been darkened or which is only slightly darker than daylight illumination, it is essential that the skiascope have a high degree of brightness. Skiascopes with such a degree of brightness have not been provided up until the present time.

A further requirement, which is of great significance above all in connection with the practical use of the skiascope, is the protection, as much as possible, of the front and rear surfaces of the reflector against soiling. Even the smallest grain of dust on the reflecting surface will result in stray light and will result in a substantial deterioration of the optical capabilities of the instrument. In this connection also there has been up to the present time a failure to achieve such a result with known skiascopes.

It is furthermore of particular importance to have the possibility of being able to determine quickly and accurately with the skiascope the amount and angle of any astigmatic error which is present in the eye of the patient.

Inasmuch as during operation of the skiascope the distance between the skiascope and the eye of the patient plays an important role, it is important that there be the possibility of determining this distance in a convenient manner.

These latter requirements are also not fulfilled by conventional skiascopes.

Of course, there are still further requirements. For example, where the examining physician wears glasses, it is of advantage to be able to use a skiascope which will permit the physician to continue to wear his glasses while conveniently operating the skiascope, and this result has not been accomplished by conventional skiascopes.

Also, up to the present time there has been a lack of conventional skiascopes of a structure which can conveniently be attached to a battery-carrying hand grip which can be used interchangeably with other types of opthalmological instruments and which is almost without exception in the possession of every physician.

SUMMARY OF THE INVENTION

It is accordingly a primary object of the present invention to provide a skiascope which will fulfill all of the above requirements and which will avoid all of the above drawbacks of the prior art.

Thus, it is an object of the invention to provide a skiascope which is particularly adapted to the practical requirements of the physician while at the same time being substantially inexpensive so that it can be purchased without any hardship.

One of the primary objects of the invention is to provide a skiascope which will direct the light in such a way that none of the light from the light source can possibly reach the eye of the examining physician. Thus, it is an object of the invention to provide a skiascope which will direct to the eye of the examining physician only light coming from the eye which is examined. In this way there is no possibility of undesirable disturbances at the eye of the examining physician from light from the light source.

In addition, it is an object of the invention to provide a skiascope which is capable of operating efficiently at daylight illumination, so that darkening of a room is not required for the operation of the skiascope of the invention. Thus, a far more accurate result can be achieved this way, as is apparent from the above discussion.

Also, it is an object of the invention to provide a skiascope which lends itself to convenient protection of the exterior surfaces of the reflector against soiling, so that even the finest particle of dust will be reliably maintained away from the skiascope.

Furthermore, it is an object of the invention to provide a skiascope which will quickly and accurately indicate the amount and angle of any astigmatic error which may be present in the patient's eye.

Also, it is an object of the present invention to provide a skiascope which will accurately give an indication of the distance between the skiascope and the eye of the patient.

Furthermore, it is an object of the present invention to provide a skiascope which can conveniently be used by physicians who wear glasses without requiring the physicians to remove their glasses.

Also, it is an object of the invention to provide a skiascope which lends itself to use with an interchangeable handle assembly, which may carry batteries, and which is used with other opthalmological instruments such as opthalmoscopes and the like.

According to the invention, an illuminating means directs light to a reflector means which serves to reflect the light into the eye which is to be examined. Light from the eye travels back through the reflector means, and the size and position of the reflector means with respect to the illuminating means is such that light from the illuminating means cannot directly reach the eye of the observer. The only light which passes through that part of the rear surface of the reflector means which is viewed by the observer is light from the examined eye. In this way disturbances resulting from traveling of light directly from the illuminating means to the eye of the physician is avoided.

BRIEF DESCRIPTION OF DRAWINGS

The invention is illustrated by way of example by the accompanying drawings which form a part of this application and in which.

DESCRIPTION OF PREFERRED EMBODIMENTS

Figures 1, 9:
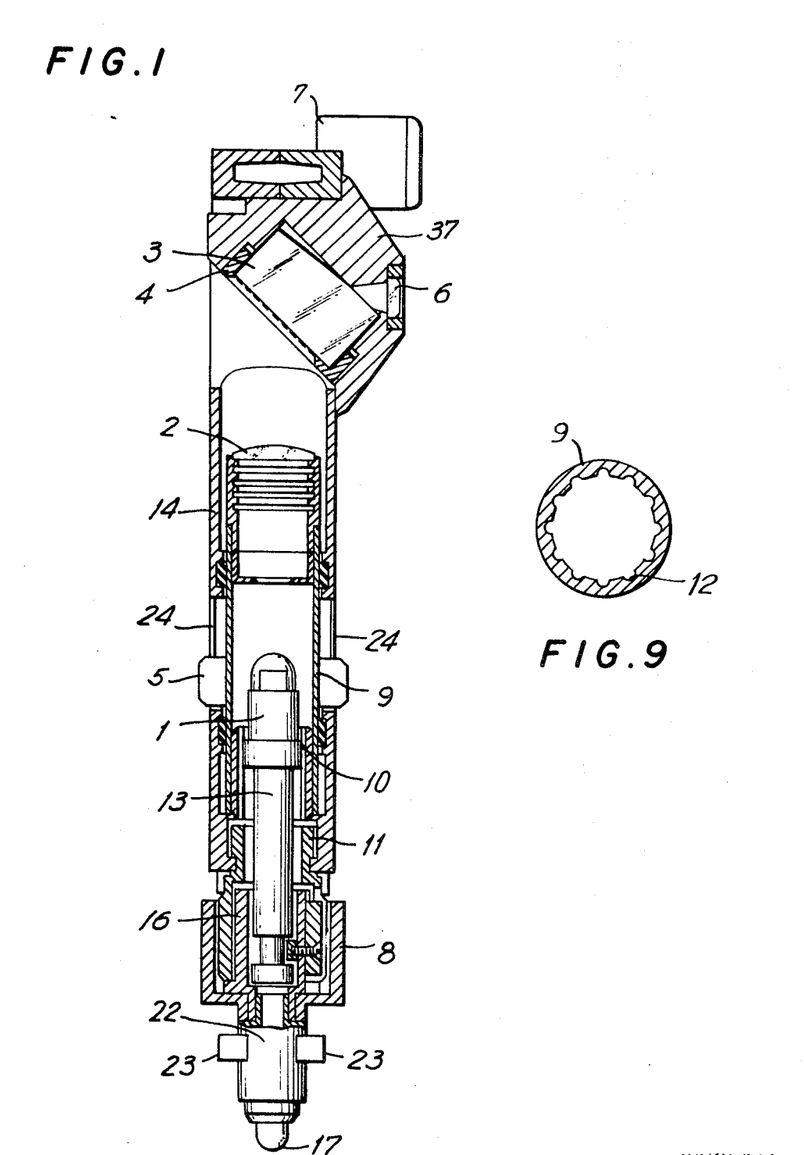
FIG. 1 is a longitudinal sectional elevation of a skiascope constructed according to the invention.
FIG. 9 is a transverse sectional elevation, on an enlarged scale as compared to FIG. 1, of that tubular component of the assembly which carries the condenser lens.
Figure 3A:
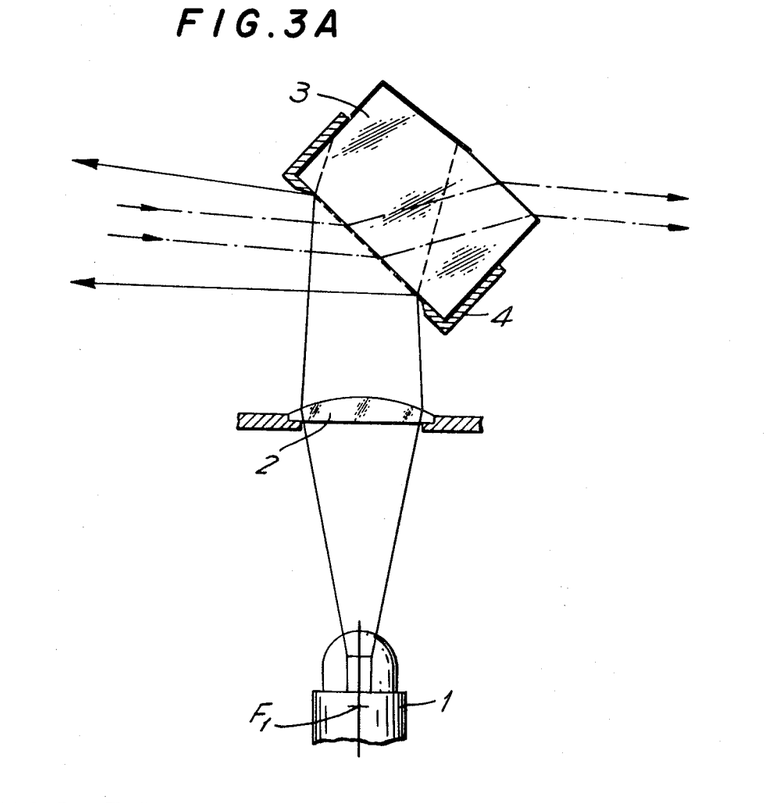
FIG. 3A is a schematic representation of the manner in which light travels with the skiascope of the invention.

Referring to FIG. 1, the light which issues from the lamp 1 of the illuminating means travels through the illuminating condenser 2 which projects either a real or a virtual image of the filament of the lamp. By way of the reflector 3 of the reflector means of the invention the light is directed forwardly, to the left, as indicated in FIG. 3A, toward the eye which is to be examined. The reflector means is situated in a suitable housing 37 which is provided with a rear opening through which the rear surface of the reflector body 3 can be seen, and this opening is covered by a planar disc 6 which serves to close the opening through which the eye is observed. In order to maintain the instrument steady and stationary while it is used it is provided with a steady rest 7 which at its right end surface, as viewed in FIG. 1, engages the forehead of the observer.

The condenser lens 2 is arranged in such a way that its distance with respect to the lamp 1 can be adjusted, so that it is possible to change, as desired, the location of the virtual or real image of the lamp filament.

The reflector 3 is of particularly great importance in connection with the utility of the skiascope. It is of course basically possible to use a conventional reflector provided with a suitable coating at its rear surface with the reflecting layer provided with an opening which will generally be elliptical and through which the observer can view the eye of the patient.

However, such a reflector has considerable disadvantages. Thus, precisely when a decisive correcting condition has been reached during refraction determination, as when, for example, given correcting lenses are supported on suitable examining spectacles in front of the patient's eye at a moment when the required correction value has been or has almost been achieved, it is only the central region of the reflector which is available for providing the required brightness for the light behavior which may be seen in the eye of the patient. For these reasons reflectors which have an opening in the reflecting layer are not satisfactory.

With the skiascope of the invention the front surface of the reflecting means is provided with a semitransparent layer so that part of the light is reflected and part of the light can pass through this layer into the body of the reflector. Thus, such reflectors will enable part of the light from the lamp 1 which has passed through the condenser 2 up to the reflector 3 to pass directly through the reflecting layer. This light illuminates the interior of the skiascope behind the reflecting surface and operates reliably to achieve a diffusely scattered light. Inasmuch as the behavior of light at the eye of the patient is in any case of smaller light intensity, such reflections of light in the skiascope can be very disturbing. There is as a practical matter no available light-absorbing lacquer which is capable of fully absorbing light in the housing of the skiascope behind the reflector.

Inasmuch as with the skiascope of the invention a semitransparent reflector is used and since the reflector will preferably be provided with a ratio of reflected light and nonreflected light of approximately 1:1, approximately one-half of the entire light from the illuminating means will travel in the interior of the reflecting body throughout its entire cross section. Thus, the danger of producing undesirable stray light is much greater with this type of reflector than a reflector which is provided with an observation opening. However, this latter type of reflector is not suitable for the reasons advanced above for the purpose of providing an exact foveolar skiascopy.

Foveal skiascopy is to be understood as the refractive condition of the eye of the patient determined with respect to the foveacentralis, inasmuch as the results of skiascopy with respect to extrafoveal regions, in particular, for example, the patilla, can have considerable differences which under certain circumstances can render fully questionable the results of the refraction determinations which have been carried out.

Referring to FIG. 3A, the lamp 1, the condenser lends 2, the reflector 3, and the reflector cover 4 of the optical system of the skiascope are illustrated therein. The light which travels from the illuminating means to the eye of the patient is shown with solid lines, while the light which comes from the illuminating means and passes through the semitransparent reflecting layer into the reflector is shown with a dotted line. The light which travels from the eye of the patient to the eye of the observer is shown as a dot-dash line. That fraction of the light from the eye of the patient which is reflected back down toward the illuminating means is not illustrated since it is of absolutely no significance.

$F_1$ indicates the focal point of the condenser lens 2 at the object side. At the illustrated location the filament of the lamp is situated within the simple focal length, so that a virtual image is provided, this virtual image, with respect to the reflection at the reflector 3 as seen from the direction of the patient, being situated behind the skiascope.

The light from the lamp, after passing through the condenser lens, reaches the front reflecting surface of the reflecting means. At this location a part of the light, such as one-half thereof, for example, is reflected toward the eye of the patient, while the other half enters into the glass body of the reflector means. With relatively thin reflectors as known and conventionally used up to the present time, a large part of the light will pass through the rear surface of the reflector at the same region thereof through which an observation is made of the eye of the patient. In other words, light which travels from the eye of the patient through the reflector passes through a rear surface area thereof which is also provided with light from the light source. Thus the observer will receive light from the light source and from the eye of the patient.

Even the smallest speck of an impurity of any type at the reflecting surface at the location where the observation and illuminating light rays engage each other results in formation of very intense stray light which under certain circumstances renders the skiascope practically useless. The light which travels through the front reflecting surface into the interior of the housing becomes diffusely scattered light which is a further source of disturbance, as already mentioned above.

In accordance with the present invention, however, the nonapertured reflector means 3, which is made of a light-permeable material, is provided with a thickness which is sufficiently great so that the lowest light rays, which is to say those most distant from the region of the rear reflector surface through which the observation is made, issuing from the lamp no longer exit out of the rear surface of the reflector within the area thereof where an observation is made of the eye of the observer. All of the light from the lamp which passes through the semitransparent reflecting surface is in the form of light rays which reach either a rear surface portion of the reflector which is not used for observation of the examined eye or the exterior cylindrical surface of the reflector. Inasmuch as these latter surfaces are matted and then provided with a lacquer of strong light-absorbing capacity, in accordance with the invention, there is a substantial freedom from any disturbing light.

The critical rear surface area of the reflector through which the examined eye is observed is in no way subjected to the passage of illuminating rays, and the light which reaches the matted and black-lacquered rear surface portion or cylindrical exterior surface of the reflector are fully absorbed into the layer of lacquer and can in any event not reach the interior of the housing of the skiascope, so that any possible formation of stray light is reliably excluded.

In this way the relationship between the signal which is received and the disturbances is very greatly and decisively improved.

Figure 3B:
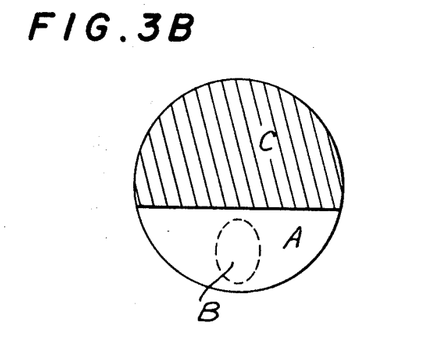
FIG. 3B shows the characteristics of the rear surface of the reflector.
Figure 3C:
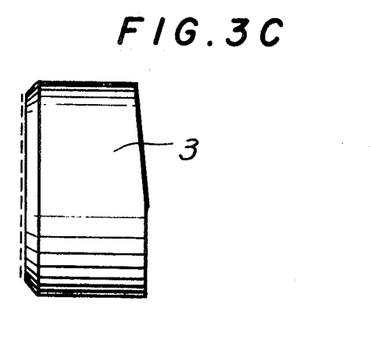
FIG. 3C is a schematic side elevation of the reflector means.

In further explanation of the operation of the reflector means, FIG. 3B shows how the reflector means appears from the rear and FIG. 3C shows how it appears from the side. The region A at the rear reflecting surface is optically ground and polished. Within this region A of the rear reflecting surface there is only a portion B which is used for making observations through the reflector. Thus, that part of the region A which does not extend to the part B can also be covered with a suitable light-absorbing covering. The region C is ground so as to be matted and is then covered with a black lacquer, in the same way as the cylindrical side surface of the reflector.

In order to achieve a definite line of demarcation between the zones A and C, according to a further feature of the invention the reflector means is provided at the area C with a surface which makes a small angle with the surface A such as an angle on the order of approximately 5°. This angular relationship is achieved during grinding of the surface C, so that the inclination of the latter with respect to the surface region A will provide a predetermined edge forming the boundary between the surface regions C and A.

As was indicated above, an important requirement is the provision of a skiascope which will operate with a high degree of brightness. For this reason, it is proposed in accordance with the invention to form the semitransparent reflector as a multiple-layer interference reflector. Such reflectors can, without any further steps, be manufacture so as to have a ratio of 1:1 between the part of the light which passes into the reflector and the part of the light which is reflected thereby. With this ratio the total amount of light which reaches the eye of the observer, which is to say the amplitude of the signal, is at a maximum.

According to a further feature of the invention the interference layer is made in such a way that a maximum of the spectral permeability of the layer is at a wavelength region which corresponds approximately to the color of the background of the eye of the patient from which the reflected light is primarily derived. Thus, in accordance with the invention, the maximum permeability of the reflecting layer is designed at approximately 600nm.

When a simple crown glass is used for the reflector of the invention, the reflector thickness must be approximately in the range of 0.5 –0.6 times the diameter of the reflector body, when achieving the separation between the observable portion and light-absorbing portion of the rear surface of the reflector in accordance with the invention. With other types of glass the relationships will be somewhat different.

It is preferred to provide a reflector body which is of cylindrical configuration. In order, however, not to make the reflector any larger than necessary with respect to its effective surfaces, the optical axis of the illuminating system must not coincide with the geometric center of the front reflecting surface. It is preferred to provide an arrangement where the optical axis of the illuminating system is situated somewhat over the geometric center of the reflector means so as to achieve in this way an arrangement where the extreme outer edge light ray remains sufficiently distant from the observation region at the rear surface of the reflector.

In order to prevent entrance of stray light into the nonused part of the front reflecting surface, this latter peripheral part of the front reflecting surface is covered with an annular cover the center of which coincides with the optical center of the illuminating system. Thus, this cover 4 is eccentrically arranged with respect to the geometric center of the reflector. As may be seen, particularly from FIGS. 1 and 3A, the cover 4 has a cylindrical portion engaging the cylindrical exterior surface of the reflecting body and an annual front portion engaging the front peripheral region of the front reflecting surface. The uppermost part of this front annular cover portion of the cover 4 is of substantially less width than the lower rear portion thereof, as is apparent from FIGS. 1 and 3, so that the eccentric arrangement of the annular cover at the front surface with this cover covering a wider peripheral region at the lower rear part of the front reflecting surface than at the upper front part thereof is apparent.

It is to be noted that the protection of the reflector means from soiling of any type, which is of particular importance in connection with the practical use of the device, is also achieved with the structure of the invention. In this connection the rear surface of the reflector, and in particular the observation part B thereof, is of especial importance. In order to reliably protect this part in particular of the reflector from dust, the housing opening through which the region B is observed is hermetically closed in an airtight manner by way of the flat transparent disc 6. In accordance with a further feature of the invention, the holder for the disc 6 is made in such a way that it can be exchanged by the operator for another holder which carries an optical lens, for example. If this lens is constructed in such a way that it corresponds to the refraction errors present in the eye of the observer, which is to say it corrects visual errors present in the eye of the examining physician or the like, then if such an arrangement is preferred by the physician it is possible to carry out the operations of the skiascope without glasses and nevertheless to see very clearly the behavior of light in the eye of the patient.

In order to protect the front side of the reflector as much as possible from dust, it is furthermore proposed to have available a suitably constructed cover made of a suitable material such as a suitable plastic and capable of being mounted on the instrument when it is not used. Inasmuch as it can frequently be overlooked during operation by the Examiner that the instrument is to be turned off when it is no longer used, so as to avoid in this way unnecessary consumption of power and in particular in the case of battery operated instruments are necessary use of the batteries, it is proposed in accordance with the invention to make the dust-protecting cover of a light-permeable plastic material in a striking color, such as red, for example, and to provide the front and rear side of the cover with a profile which directs the light which still comes out of the skiascope which is still turned on in a number of different directions so that the operator cannot fail to notice that the instrument is still turned on.

During operation of the skiascope the movement of light and shadow limits at the background of the eye is observed. From the manner in which these movements take place the necessary decision with respect to the refractive condition of the examined eye is made. For these reasons it is important that the operator of the instrument not only be able to hold the instrument stationary, but also be able to safely carry out small rotary and swinging movement, as is required during operation of the skiascope.

Figure 4A:
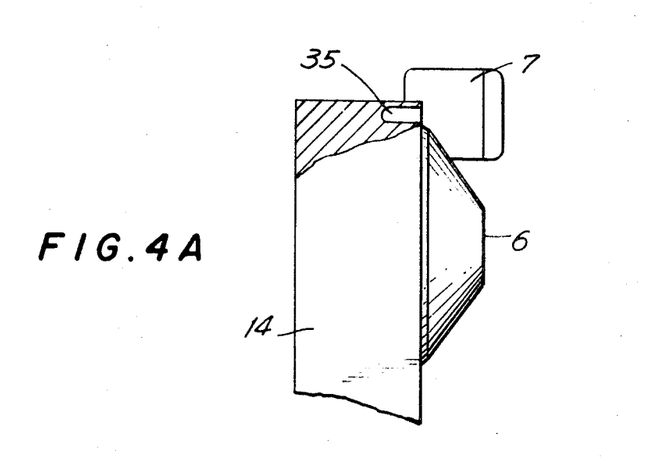
FIG. 4A shows a skiascope with one type of steady rest for engaging the forehead.

In order to achieve this latter type of operation, the skiascope of the invention is provided at its upper portion with a removable or interchangeable steady rest to engage the forehead of the operator. The exchangeability can, for example, be achieved by providing the steady rest with a pair of cylindrical pins 35 which are received in corresponding bores of the housing 14 of the skiascope. Such pins are schematically illustrated in FIGS. 4A and 4B.

As a result of this possibility of interchanging the steady rests, the latter can be provided in different configurations. Thus, when the examining physician or the like operates the skiascope without glasses, the use of the steady rest 7 is satisfactory. Thus, the right end surface of the steady rest 7, as viewed in FIG. 4A, will engage the forehead over the eye of the observer. Since with both of the embodiments of FIGS. 4A and 4B the surface of the forehead which is engaged by the steady rest is slightly curved, it is possible to carry out during operation of the skiascope the necessary turning movements of the instrument in a particularly easy, convenient, and accurate manner.

For physicians or the like who will wear glasses and wish to continue to wear them during operation of the skiascope, the steady rest 7 can be removed since the size thereof will cause it to engage the upper edge of the glasses. In addition, there is the danger that the edge of the holder of the covering disc 6 will engage the lens of the glasses, with possible scratching of this lens by the movement of the instrument.

Figure 4B:
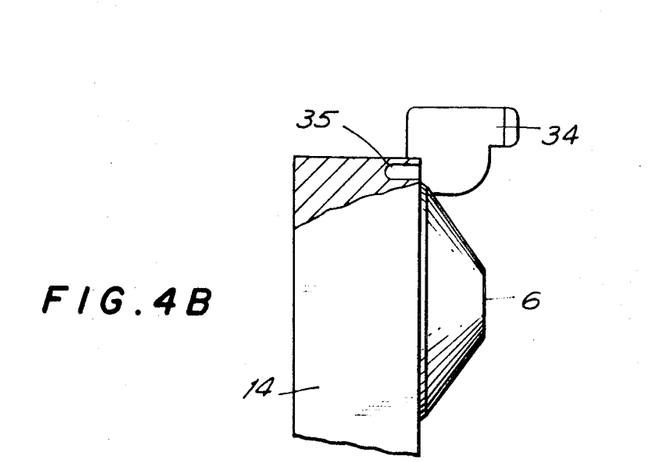
FIG. 4B shows a skiascope with another type of steady rest particularly designed for people with glasses.

In order to avoid this extremely disturbing disadvantage present in conventional skiascopes, an enlarged steady rest 34, shown in FIG. 4B is provided to replace the steady rest 7. This steady rest 34 has such a great distance from the observation opening 6 that it can engage the forehead beyond the edge of the glasses and thus enables the eye of the patient to be conveniently observed through the observation opening. The steady rest 34 is made wider than the steady rest 7, so that the outermost edge of the holder of the disc 6 is maintained at such a distance from the crest of the lens of the glasses of the observing physician or the like so that scratching is avoided. Thus, as may be seen from a comparison of FIGS. 4A and 4B, the right end surface of the steady rest 34 is situated to the right beyond the observation lens 6 by a distance greater than the distance between the right end surface of the steady rest 7 and the observation plate 6 of FIG. 4A. Thus, with this construction it is possible for an individual who wears glasses to use the skiascope of the invention without any difficulty whatsoever.

The requirement of achieving a quick and accurate determination of the astigmatism with the skiascope is fulfilled in a known way by using for the lamp 1 a linear filament which extends perpendicularly across the axis of the lamp, this latter axis extending in the direction of light travel. It is known that skiascopes which make use of a lamp of this type so as to form line of dash-types of skiascopes are particularly suited for the determination of astigmatism.

In order to be able to take full advantage of the use of the skiascope, the skiascope of the invention is provided with a rotary lamp the rotation of which will result in turning of the projected band of light. Also, the skiascope of the invention is capable of adjusting the distance between the lamp 1 and the condenser 2, so as to determine the divergence of convergence of the bundle of rays used during operation of the skiascope. Both of these adjustments are carried out in accordance with the invention with a single operating ring 5.

According to a particular embodiment of the lamp 1, it is provided not with a linear filament but rather with a filament which has a pair of legs angularly intersecting each other at a right angle and having in most cases the same length, with the plane which is occupied by this V-shaped filament extending perpendicularly across the optical axis of the skiascope.

This latter arrangement has further advantages. When the principal axis of the astigmatism has been found, then in order to control the correctness of the determination it is of advantage to operate the skiascope according to a line perpendicular to this axis. When the lamp has a single linear filament, this result is achieved by turning the lamp filament, or the operating ring 5, through an angle of 90°. If, however, there is used instead a lamp having filament legs which intersect at a right angle, it is then possible without being required to move the operating ring 5 to make an examination first with the band of light achieved from the one leg of the lamp filament along one axis and then immediately thereafter to carry out an examination with only a slight turning of the instrument by way of the other light band at the other axis, achieved by way of the other filament leg of the lamp.

Since there are skiascope operators who prefer the so-called spot type of skiascopy, it is furthermore proposed in accordance with the invention to be able to exchange a given lamp for a lamp having a filament which is of point-shaped configuration to the greatest extent possible, so that this latter type of lamp can be exchanged for the lamp which has the linear filament. Such lamps, which provide the spot-type of operation, are for the most part provided with lamp filaments the configuration of which is in the form of a coil whose diameter is equal to the length thereof, so that the projection of the illuminating area forms a square resulting not in any band or linear shaped image but rather in a spot-shaped illuminating image when the filament is not sharply imaged. Thus, the lamp of the invention can also be used to carry out conventional spot skiascopy.

With all methods of skiascope operation the distance between the skiascope and the examined eye plays an important role. In order to determine this distance it is known to build into the skiascope a suitable measuring band which gives this distance. This solution is not satisfactory for many reasons, so that it has also already been proposed to build into the skiascope an optical range finder. Such an arrangement is shown, for example, in the German Auslegeschrift Pat. No. 1,245,166. The optical range finder shown in this latter publication operates in such a way that a second reflector situated in the head of the skiascope provides a double image of the examined eye, and when the two images are united into one it is possible to determine the particular distance between the skiascope and eye, in a manner completely analogous to the manner in which range finders in photographic cameras have long been used. A device of this type is only of limited advantage inasmuch as the examined eye, because of its nongeometric form, is only poorly suited for accurate achievement of the coincidence of both images. As a result, the arrangement shown in this letter publication makes it possible to use the skiascope only with difficulty, if indeed it can be used at all, inasmuch as the second image operates in a strongly irritating manner when it is not in full coincidence with the primary image. It is therefore proposed to provide with the skiascope of the invention a different type of distance measurement.

As has been referred to above, the operating ring 5 is accessible to the operator for adjusting the distance between the condenser lens 2 and the lamp 1. In one range of adjustment of this distance between the lamp and condenser lens the distance been the condenser lens and the filament of the lamp is greater than the focal length of the condenser lens, so that a real image results. Thus, it is possible at any time to achieve a sharp image of the filament either at the eye of the patient, or the area primarily surrounding the patient's eye, or at the testing glasses or phoroptor. Thus, the distance between the condenser lens and the filament of the lamp is a direct function of the distance of the skiascope from the eye of the patient or from the testing spectables.

It is therefore proposed in accordance with the invention to provide the operating ring 5 with an index which will permit the position of the operating ring with respect to a scale on the housing to be read directly in the distance units such as in meters, for example. Instead of or in addition to such a distance scale it is also possible to provide the housing with a scale which gives the reciprocal value of the distance in meters, so that the unit then is in diopters which are used so frequently in the determination of the refraction. Thus, as may be seen from FIG. 5, the operating ring 5 is provided with an annular groove which forms an index coacting with the diopter scale 25. The same index is provided to coact with other scale graduations showing whether the bundle of light rays is convergent or divergent or parallel.

Instead of providing an index on the operating ring 5, a special scale-reading window can be provided on the housing 14 and through this window it is possible to read the position of an index which is fixedly connected with the tube 9 which carries the condenser lens, this latter index moving with respect to a scale which is on the housing, so that the reading can now be made through such a window. It is also possible to magnify in known way the path of movement of the index carried by the tube 9 and movable with respect to the stationary scale, this magnification being brought about mechanically, as for example, through a suitable lever transmission, so as to facilitate the reading. It is also possible to mount in a known way a magnifying lens at the window through which the scale is read, so that in this way also the accuracy with which the reading is made can be increased.

As a further possibility it is also proposed to reflect the scale and the index which moves with respect thereto into a suitable window through which a reading is made. The components required for this purpose, such as semitransparent reflectors, light conductors, prisms, and the like, are very well known in the art. In order not to annoy the operator of the skiascope with a scale image which is reflected into the viewing field of the skiascope, a suitable device can be provided for covering the scale during operation of the skiascope so that by pressing upon a button or a corresponding operating element the scale image will appear to be read while at all other times it remains covered during operation of the skiascope. As a further development of the skiascope of the invention in connection with the distance measurement it is also proposed to provide a further embodiment where instead of the lamp filament a special distance measuring mark is imaged at the eye of the patient or at the testing spectacles. Such an arrangement can be of advantage inasmuch as a sufficiently accurate positioning of the location of the filament of the lamp with respect to the index carried by the tube 9 is possible, but during manufacture of the lamp a certain cost is involved in the accurate adjustment thereof.

Thus, in the embodiment of the invention which is actually provided there is directly over the lamp a measuring index directly fixed to the axially shiftable tube 9, this index having the form, for example, of a bright line on a dark background or a dark line on a bright background. Inasmuch as the accurate adjustment of this measuring index with respect to the tube 9 presents no particular difficulty, it is possible to assure a high degree of accuracy in the distance measurement. In order to increase the brightness of the measuring index image a condenser lens can be situated between the measuring index and the lamp.

Figure 5:
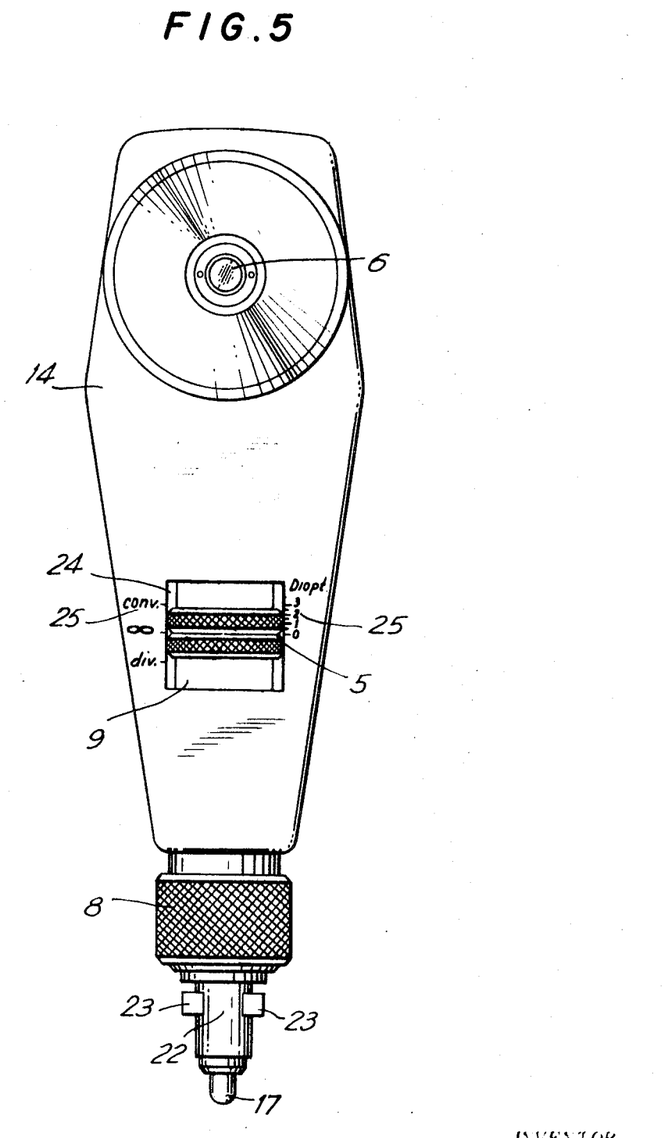
FIG. 5 is an elevation showing how the skiascope appears from the rear so that various scales and the like are visible in FIG. 5.

It is also proposed in accordance with the invention to provide in addition to the distance scale, or instead of same, when distance measurement is not provided, qualitative factors such as those shown at the left of FIG. 5 to indicate whether the bundle of rays is divergent, parallel or convergent.

The light intensity of a lamp with a linear filament, as is used most frequently for the skiascope, is limited by reason of the available space and for manufacturing reasons. With a high light intensity the lamp has a relatively short life.

Figures 6, 7, 8:
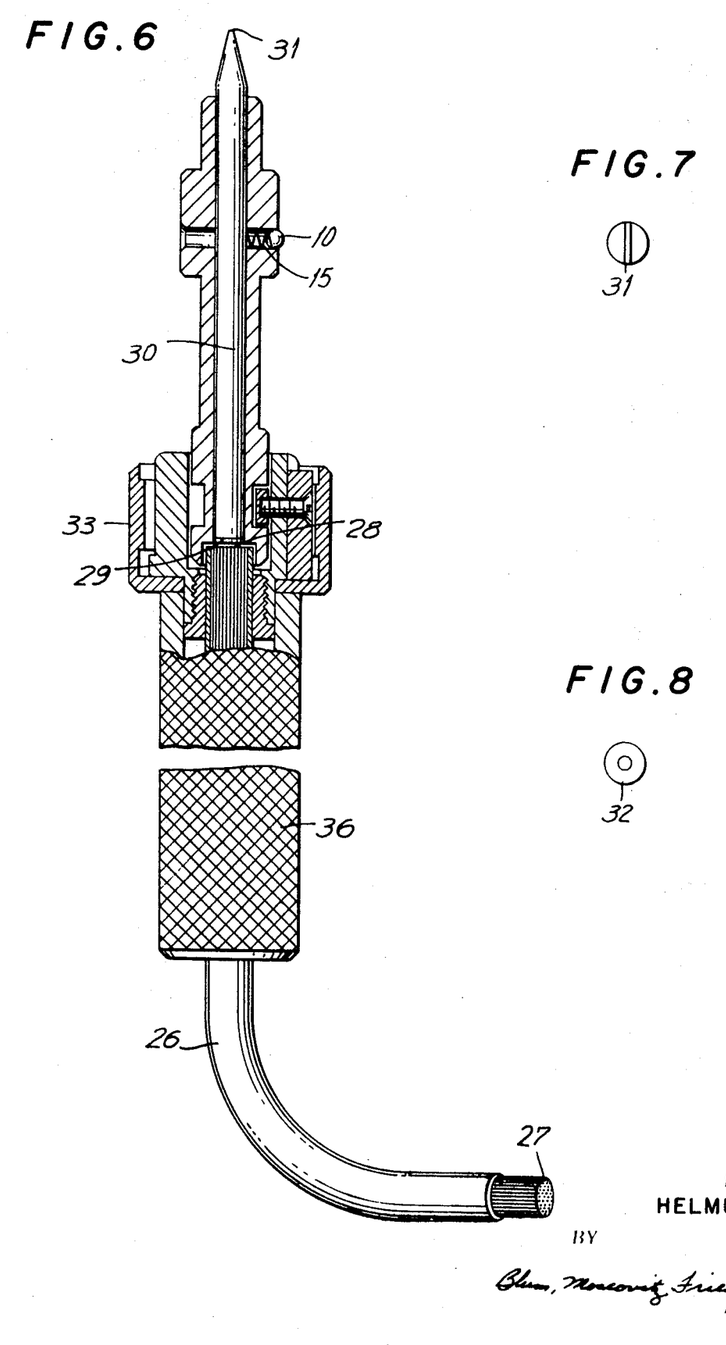
FIG. 6 is a partly sectional and partly schematic elevation of another embodiment of an illuminating means.
FIG. 7 is a schematic top plan view of the upper tip of the illuminating means of FIG. 6.
FIG. 8 is a schematic top plan view showing another possible configuration of the upper tip of the skiascope.

It is therefore proposed in accordance with the invention to provide an embodiment of the skiascope where there is an external source of light from which the light travels in a manner known per se through an optical light-conducting cable made up of light-conducting fibers. In order to make such construction possible, there is provided, as shown in FIG. 6, a light-conducting cable 26 provided with the light-conducting fibers 27. The one end of the cable is connected in a known manner with a light projector which is not shown in FIG. 6. The opposed end 28 of the light-conducting cable is held in a suitable holder of metal or plastic and is optically ground and polished at its upper end surface, or it can be covered at this location with a layer of transparent plastic which has at its exterior surface also a primarily plane upper face. Directly opposite to this fiber end surface 28 is located a light entrance surface 29 which is also primarily plane and which forms an end of the light conductor 30 of variable cross section. This conductor 30 serves to change the cross section of the conductor of the light and can be made of light-conducting fibers of the same type as those which are used for the cable 26. It is also possible to use, however, a massive glass bar which in an analogous manner has an outer casing of a glass of low refractive index. Such light conducting bars, which are nothing more than light-conducting fibers of correspondingly larger cross section, are well known.

The cross section changing conductor 30 has at its entrance end surface 29 a primarily circular cross section corresponding to the cross section of the end 28 of the cable 26. At its opposed light-discharging end surface 31, however, the light conductor 30 has a rectangular cross section, as is apparent from FIG. 7 in particular. However, it is also possible to provide the light-discharging end of the bar 30 with a circular cross section 32, as is apparent from FIG. 8. Thus, with the much of FIG. 8 the discharge end 32 will have a diameter substantially smaller than the diameter of the entrance end surface 29.

When using a bar 30 with an end surface 31 which is the configuration which will primarily be used, one side of the rectangular end surface 31 is much smaller with respect to the length of the other side, so that there is again provided a skiascope of the linear type. On the other hand, when using the circular discharge end surface 32 shown in FIG. 8, a spot-type of skiascope is provided. Furthermore, the particular bar 30 which is used may be exchanged for another so that the skiascope may have a pair of different bars 30 for changing the cross section of the bundle of light from that of a circle corresponding to the cross section of the cable 26 to one of a pair of different cross sections such as the configurations 31 and 32 shown respectively in FIGS. 7 and 8 described above. However, it is also possible to have a third bar with still another configuration of the light-discharging surface such as a configuration where this surface is in the form of a right angle composed of elongated surface portions which extend perpendicularly with respect to each other.

The skiascope of the invention can be constructed for use either with a light-conducting cable and cross section changing bar 30, or in a preferred construction it can selectively be used with a lamp socket 13 which carries the lamp 1 so that it is possible to selectively use either the socket 13 and lamp 1 or the cross section changer 30 and cable 26. In accordance with the invention the cable 26 is provided at the region of its end 28 with a surrounding tube forming a handle 36. At the upper end of this handle is a connecting element 33 which corresponds to the cap nut 8 of FIGS. 1, 2, and 5. This nut 8 serves with the construction of FIGS. 1, 2, and 5 to hold the socket or lamp carrier 13 in the housing 14.

The cross section changer 30 is made in such a way that it is angularly turnable in a manner analogous to the lamp-carrier 13 in such a way that upon turning of the operating ring the cross section changing bar is turned while the light-conducting cable 26 of course remains stationary at its end 28.

Figure 2:
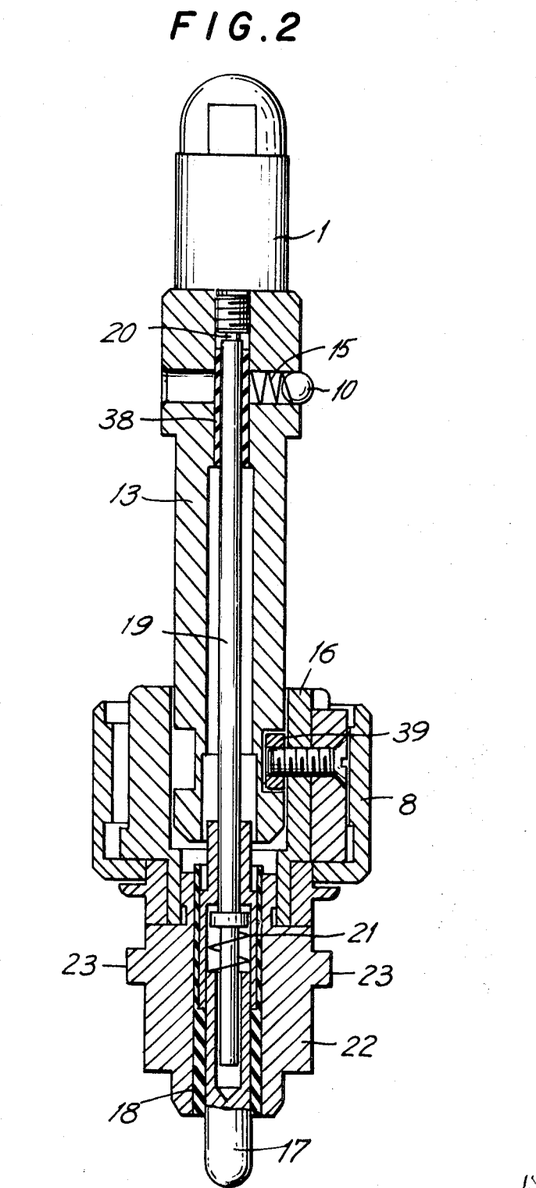
FIG. 2 is a sectional elevation on an enlarged scale as compared to FIG. 1 showing the illuminating means only, FIG. 2 showing details of the illuminating means which are not visible in FIG. 1.

Referring now to FIGS. 1 and 2, the embodiment of the skiascope of the invention which is illustrated therein includes optical and mechanical elements situated in a housing 14 made of a material which while being as light as possible nevertheless is sufficiently resistant to breakage, this material preferably being in the form of an aluminum die casting or in the form of a suitable plastic. Within the housing 14 is located the lamp-carrier 13, or the cross section changer 30. This carrier socket 13 receives at its upper end the lamp 1, for example by way of a suitable thread or a suitable bayonet connection. The conducting of current to the central contact of the lamp takes place through a current conductor 19 (FIG. 2) which is pressed by way of a spring 21 against the central lamp contact. Either directly or through the spring 21 the conductor 19 is placed in electrical connection with the electrical prong 17 to which in any suitable way one pole of the operating voltage is connected. The conductor 19 is insulated with respect to the socket 13 by way of insulating sleeves 18 and 38. The lamp carrier 13 is currently supported within the sleeve 16. At its lower end the lamp carrier 13 is provided with a groove in which a guide pin 39 is located. This pin 39 being fixed to the guide sleeve 16, so that in this way the rotary socket 13 is prevented from moving axially.

The cap nut 8 holds the lamp-carrier 13 within the housing 14 and permits at any time a changing of the lamp carrier when a burnout lamp is to be exchanged.

The lower end of the guide sleeve 16 is constructed so that the entire skiascope can be connected with a hand grip. This hand grip can either take the form of a cable grip, in the event that the source of potential for the lamp utilizes a line transformer, or it can also take the form of a battery-carrying grip with conventional zinc-carbon batteries or with rechargeable batteries. In order to be able to use different grips interchangeably with the skiascope, the connecting component 22 which serves to connect the grip to the skiascope can be provided either with a threaded type of connection by means of which it is threaded into the grip or a bayonet connection can be provided having, for example, a pair of bayonet projections 23 which are received in corresponding bayonet slots or grooves of the grip.

The lamp-carrier or socket 13 together with the lamp 1 carried thereby must be capable of turning about its own axis upon turning of the operating ring 5. Since, however, the operating ring 5 at the same time serves to axially shift the condenser lens 2, the tube 9 which carries the lens 2 is provided at its lower portion with a plurality of interior axially extending grooves 12 each of which has the cross section of part of a circle, as is particularly apparent from FIG. 9. Of course, the housing 14 is provided with suitable opposed axially extending slots 24 through which the ring 5 is accessible to be angularly turned or axially displaced by the operator. The upper part of the lamp-carrier 13 is provided, as shown most clearly in FIG. 2, with a radial bore receiving a ball member 10 acted upon by the compressed spring 15. Thus, this spring-pressed ball arrangement will enable the ball 10 to be received in any one of the grooves 12 when the entire lamp carrier is displaced into the housing 14, so that the ball 10 can enter into any groove 12 without making it necessary for the operator to provide a precise angular alignment between the carrier 13 and the tube 9 when the parts are assembled. Thus, whenever a lamp is exchanged and the carrier 13 is again introduced into the tube 9, it is not necessary for the operator to seek a correct angular position of the lamp carrier with respect to the ring 5, as would be required if only one groove 12 were present. On the other hand, this construction provides an easy axial shiftability of the ring 5 together with the tube 9 and the condenser lens carried thereby so that both axial and angular adjustments can easily be carried out, as is required for precise operation of the skiascope.

At the upper part of the skiascope is located the reflector means 3 which is situated within the reflector holding or housing part 37 which at the same time is provided with the viewing aperture which is covered by the disc 6, as was pointed out above. This housing component 37 and the structure carried thereby is constructed as a separate unit which can be easily mounted on the housing 14. Such an arrangement is of advantage because the reflector means 3 forms the sensitive controlling element of the skiascope and therefore might require occasional changing. It is also possible to provide different embodiments of the skiascope wherein all or a substantial part of the features described above are united.

I claim:

1. A skiascope including illuminating means and observation means, nonapertured semireflector means included in both said illuminating means and said observation means, said reflector means being made of a light permeable material of substantial thickness and including a front surface directed towards an eye which is to be examined as well as an opposed rear surface through which the eye is observed, said reflector means coacting with said illuminating means to direct from the latter light to be reflected from the front surface thereof to the eye which is to be examined, said reflector means being so positioned that the optical axis of said illuminating means intersects the front reflecting surface of said reflector means at a point spaced from the geometric center of said reflector means whereby the extreme outer edge light ray of said illuminating means remains sufficiently distant from the observation region at the rear surface of said reflector means, and supporting said reflector means at a position with respect to said illuminating means which not only will direct light from the front surface of said reflector means to the eye but which will in addition direct light from the eye through said light-permeable material of said reflector means to the eye of an observer at the rear surface of said reflector means, said reflector means coacting, by its shape and size as well as said position, with said support means and with said illuminating means for receiving light travelling into said light-permeable material directly from said illuminating means at only one part of said rear surface while providing another part of the latter surface for observation, the latter part of said rear surface through which an observation is made of the eye being completely separate from any part of said rear surface which receives light from said illuminating means, said rear surface of said reflector means including a portion receiving the light travelling into said permeable material from the illuminating means and situated at a slight angle to that portion of said rear surface used for viewing, and a light absorbing covering on the portion of said rear surface of said reflector means not employed for viewing and upon the exterior surface of said reflector means to reduce the possibility of stray reflected light from interfering with the observation being made so that the light reaching the eye of the observer comes only from the examined eye and not from light of the illuminating means which is not reflected to the examined eye.

2. The combination of claim 1 and wherein said reflector means includes a reflecting body of predetermined diameter having a thickness on the order of approximately 0.5—0.6 times said diameter.

3. The combination of claim 1 and wherein said reflector means includes a reflecting body of said predetermined thickness, an annular cover covering a peripheral region of said front surface of said reflector means to an extent which contributes to the displacement of light from said illuminating means engaging said rear surface to a part of the latter displaced from the part through which an observation is made of the eye, said cover having at a portion thereof nearer to said illuminating means a width greater than a portion of said cover more distant from said illuminating means, so the part of said front surface nearer to said illuminating means is covered to a greater extent than the part thereof more distant from said illuminating means.

4. The combination of claim 1 and wherein said front surface of said reflector means is partly transparent and partly reflecting.

5. The combination of claim 1 and wherein said reflector means includes a reflecting body which is matted and covered with a black lacquer of high light-absorption at those surfaces of said body which do not reflect light in the desired direction and which do not serve for observation of the examined eye.

6. The combination of claim 1 and wherein said support means includes a housing in which said rear surface of said reflector means is enclosed, said housing being formed with an opening through which said rear surface may be seen, and said opening being closed in a dusttight manner by an optical element through which the observer views that part of the rear surface through which light travels from the examined eye.

7. The combination of claim 6 and wherein said reflector means includes an annular cover covering a peripheral region of the front surface of said reflecting body, said cover, reflecting body, and optical element all being carried by said hosing, and a second housing accommodating said illuminating means and removably connected with the housing which accommodates said reflector means.

8. The combination of claim 6 and wherein said housing interchangeably carries one of a pair of steady rests for engaging the forehead of the user of the skiascope to steady the latter, one of said steady rests being designed for an individual who does not wear glasses while looking through said opening of said housing while the other of said steady rests is formed with a stepped portion which clears glasses and engages the forehead to enable an individual wearing glasses to also use the skiascope without removing the glasses.

9. The combination of claim 1 and wherein said illuminating means includes a lamp having an axis extending in the direction of travel of light to said reflector means and including a substantially linear filament extending perpendicularly across said axis, said illuminating means also including an illuminating condenser through which light from said lamp passes, and a single operating means operatively connected with said lamp for adjusting the angular position of said filament with respect to said axis as well as for adjusting the distance between said lamp and condenser lens.

10. The combination of claim 1 and wherein said illuminating means includes a lamp having an axis along which the light travels to said reflector means, said lamp having a filament composed of a pair of legs forming a right angle with respect to each other and situated in a plane which is normal to the lamp axis, said illuminating means also including a condenser lens, and operating means operatively connected with said lamp for adjusting the annular position thereof with respect to said axis and the distance between said lamp and condenser lens.

11. The combination of claim 1 and wherein said illuminating means includes a lamp having a predetermined axis along which the light travels to said reflector means and including a filament of substantially point-configuration in the form of a filament coil having a width and diameter approximately equal to each other, a condenser lens forming part of said illuminating means and situated between said lamp and reflector means, and operating means operatively connected to said lamp for adjusting the distance between the latter and said condenser lens.

12. The combination of claim 1 and wherein said illuminating means includes a lamp from which a bundle of rays is derived, said lamp having a filament which is to be imaged sharply at the eye which is examined, operating means coacting with said lamp for adjusting the latter to achieve a sharp image of the filament at the eye which is examined, and indicating means coating with said operating means for indicating directly whether the bundle of rays traveling from the skiascope is parallel, divergent or convergent.

13. The combination of claim 1 and wherein an indicating means is provided for indicating the distance between the eye and the skiascope.

14. The combination of claim 1 and wherein said illuminating means includes a lamp and condenser lens, and an index situated between said lamp and condenser lens to be sharply imaged at the eye which is to be examined, and means for indicating the distance between the sharp image of said index and the skiascope.

15. The combination of claim 1 and wherein said illuminating means includes a light-conducting cable for conducting light from a source outside of the skiascope, said cable terminating in a predetermined end surface, and an elongated light-conductor extending from said end surface of said cable for conducting the light therefrom, said conductor terminating in an end of a preselected configuration different from that of said cable and the remainder of said light-conductor and from which the light travels to said reflector means.

16. The combination of claim 15 and wherein said illuminating means includes a lamp interchangeable with said cable, and operating means common to said lamp and cable for adjusting either the lamp or said cable and light-conducting means with the latter.

17. The combination of claim 1 and wherein said illuminating means includes a lamp, a condenser lens situated between said lamp and said reflector means, a lamp socket carrying said lamp, an elongated tube carrying said condenser lens and surrounding said socket, an operating ring surrounding and engaging said tube, an elongated tubular housing formed with openings through which said ring is accessible to be turned about the axis of said tube as well as to be displaced along said axis, said tube being formed in its interior with a plurality of axially extending grooves, a spring-pressed ball assembly carried by said socket with said ball extending into any one of said grooves so that when said tube is assembled with said socket no care need to exercised with respect to selecting a given angular position of said tube, and said spring-pressed ball coacting with said tube for transmitting angular turning of said tube by way of said ring to said socket and lamp therewith to angularly adjust the position of said lamp while axial displacement of said ring will bring about an adjustment of the distance between said lamp and condenser lens, said housing terminating in a bottom end region having a means for connecting to said housing a handle through which electricity is transmitted to said lamp, said carrier having an internal axial bore in which an elongated conductive pin is situated in engagement with a contact at an inner end of the lamp in said socket, and a pin electrically connected with said lamp-engaging pin and projecting from the bottom end of said housing to form part of a circuit in the handle connected to said housing to transmit electricity to the lamp, whereby when the lamp is turned the part of the circuit through said pins to the lamp is not disturbed.